US012435541B2

(12) United States Patent
Tan et al.

(10) Patent No.: US 12,435,541 B2
(45) Date of Patent: Oct. 7, 2025

(54) LOCKSET AND DOOR LOCK

(71) Applicant: Zhejiang Hanyun Hardware Co. Ltd., Quzhou (CN)

(72) Inventors: Haisheng Tan, Hangzhou (CN); Jun Ma, Hangzhou (CN)

(73) Assignee: Zhejiang Hanyun Hardware Co. Ltd., Quzhou (CN)

( * ) Notice: Subject to any disclaimer, the term of this patent is extended or adjusted under 35 U.S.C. 154(b) by 88 days.

(21) Appl. No.: 18/531,756

(22) Filed: Dec. 7, 2023

(65) Prior Publication Data

US 2025/0137289 A1 May 1, 2025

(30) Foreign Application Priority Data

Oct. 30, 2023 (CN) ........................ 202311431549.1

(51) Int. Cl.
*E05B 13/00* (2006.01)

(52) U.S. Cl.
CPC ................................. *E05B 13/004* (2013.01)

(58) Field of Classification Search
CPC ...... E05B 13/00; E05B 13/002; E05B 13/004; E05B 13/10; E05B 13/101; E05B 13/105; E05B 13/106; E05B 47/0657; E05B 47/0661; E05B 47/0665; E05B 47/0669; E05B 47/0673
USPC .............................................. 40/101; 70/101
See application file for complete search history.

(56) References Cited

U.S. PATENT DOCUMENTS 4,887,442 A * 12/1989 Lavelle ............... E05B 47/0673 70/277
2004/0237608 A1* 12/2004 Chen ..................... E05B 13/101 70/224
2007/0051145 A1* 3/2007 Chang .................. E05B 13/108 70/279.1
2008/0072634 A1* 3/2008 Don ........................ E05B 3/003 70/101
2012/0013135 A1* 1/2012 Moon ................ E05B 17/2026 292/165

(Continued)

FOREIGN PATENT DOCUMENTS

CN 102304986 A 1/2012
CN 113236024 A 8/2021

(Continued)

*Primary Examiner* — Nathan Cumar

(74) *Attorney, Agent, or Firm* — Bayramoglu Law Offices LLC

(57) ABSTRACT

A lockset and a door lock belong to the technical field of door locks. The lockset includes a drive shaft. Two ends of the drive shaft are respectively connected to handle assemblies. The handle assembly includes a handle and a lock seat. A linkage mechanism is provided between the handle of one of the handle assemblies and the drive shaft, and is configured to lock the handle and the drive shaft such that the handle and the drive shaft are circumferentially fixed. The other handle assembly is provided with a switch mechanism for driving the linkage mechanism to lock or unlock. When the switch mechanism drives the linkage mechanism to unlock, the handle is rotatable independently relative to the drive shaft. Therefore, the safety performance of the lockset is improved, and the service life thereof is extended.

18 Claims, 7 Drawing Sheets

A

(56) References Cited

U.S. PATENT DOCUMENTS

| | | | | |
|---|---|---|---|---|
| 2013/0233033 | A1* | 9/2013 | Collins | E05B 55/005 70/101 |
| 2015/0007620 | A1* | 1/2015 | Yoon | E05B 1/0038 70/101 |
| 2016/0145898 | A1* | 5/2016 | Ohl | E05B 47/0001 70/101 |
| 2017/0275925 | A1* | 9/2017 | Murphy | E05B 55/005 |
| 2018/0195314 | A1* | 7/2018 | Lanusse | E05B 65/0007 |
| 2019/0136581 | A1* | 5/2019 | Barker | E05B 63/0056 |
| 2020/0256087 | A1* | 8/2020 | Balasubramaniam | E05B 15/0033 |
| 2022/0145666 | A1* | 5/2022 | Ma | E05B 13/004 |

FOREIGN PATENT DOCUMENTS

| | | | |
|---|---|---|---|
| CN | 221568153 | U | 8/2024 |
| KR | 20140017905 | A | 2/2014 |

* cited by examiner

LOCKSET AND DOOR LOCK

CROSS REFERENCE TO THE RELATED APPLICATIONS

This application is based upon and claims priority to Chinese Patent Application No. 202311431549.1, filed on Oct. 30, 2023, the entire contents of which are incorporated herein by reference.

TECHNICAL FIELD

The present disclosure belongs to the technical field of door locks and relates to a lockset, in particular to a lockset and a door lock.

BACKGROUND

A conventional door lock includes an interior handle and an exterior handle. The interior handle is provided at an inner side of a door, and the exterior handle is provided at an outer side of the door. The interior handle and the exterior handle are fixedly connected through a drive shaft. The interior handle, the drive shaft, and the exterior handle rotate synchronously. The drive shaft is connected to a deadbolt mechanism and rotates to control a deadbolt to extend and retract, thereby closing and opening the door. The conventional door lock is further provided with a locking switch. Generally, the locking switch is provided at the interior handle and operated by a user at the inner side of the door to lock the door lock. The locking switch is generally a limit structure, which is configured to lock the interior handle circumferentially such that the interior handle cannot rotate. When the interior handle cannot rotate, the drive shaft and the exterior handle cannot rotate, either. Since the drive shaft cannot rotate, the deadbolt connected to the drive shaft cannot retract, resulting that the door cannot be opened, thereby preventing forced entry.

However, due to the fact that the locking switch of the existing door lock is generally a limit structure acting on the interior handle, a strong external force can be applied to the exterior handle to break the locking switch and forcibly rotate the drive shaft to open the door. Therefore, the safety of the existing door lock is insufficient. In addition, if the exterior handle is frequently pulled for a long time after the door lock is locked, the exterior handle is easy to shake, causing the entire door lock to be easily damaged. To address these problems, it is desirable to develop a safe and durable door lock.

SUMMARY

An objective of the present disclosure is to propose a lockset and a door lock to address the aforementioned technical problems in the prior art, that is, poor safety and short service life of the existing door lock.

The objective of the present disclosure is achieved by the following technical solutions.

A lockset includes a drive shaft, where two ends of the drive shaft are respectively connected to handle assemblies; the handle assembly includes a handle and a lock seat; a linkage mechanism is provided between the handle of one of the handle assemblies and the drive shaft, and is configured to lock the handle and the drive shaft such that the handle and the drive shaft are circumferentially fixed; the other handle assembly is provided with a switch mechanism for driving the linkage mechanism to lock or unlock; and when the switch mechanism drives the linkage mechanism to unlock, the handle is rotatable independently relative to the drive shaft.

The lockset includes two handle assemblies; each handle assembly include a lock seat and a handle; the lock seat is fixedly connected to a door, and the handle is rotatably connected to the lock seat; and a drive shaft for driving a deadbolt to extend and retract is connected between the two handles.

Unlike a conventional door lock, in the present disclosure, one of the handles is connected to the drive shaft through a linkage mechanism. The linkage mechanism has two states. Under a normal state, the linkage mechanism can lock (i.e. circumferentially fix) the handle and the drive shaft. In this state, the handle is rotatable to drive the drive shaft to rotate synchronously. When the drive shaft rotates, it normally drives the deadbolt to open and close the door. In a locked state, the linkage mechanism can unlock the handle and the drive shaft to release them from a circumferential fit. In this state, when there is an external force to rotate the handle, the handle can be rotated normally. However, the handle cannot drive the drive shaft to rotate, thereby making it hard to open the door normally. The two states of the linkage mechanism are switched through the switch mechanism of the other handle.

In summary, the biggest difference between the lockset of the present disclosure and the conventional lockset is that one of the two handles, namely an exterior handle, can be rotated by an external force when in the locked state, but it cannot drive the drive shaft to rotate. Even if a strong external force is applied to the handle, the drive shaft cannot rotate, greatly improving the safety performance of the entire lockset. In addition, in the locked state, the handle is rotated to remove a certain amount of a torsional force, effectively preventing frequent or long-term twisting and shaking from causing deformation, thereby prolonging the service life of the lockset. Therefore, the present disclosure improves the safety performance of the lockset and extends the service life thereof.

In the lockset, the handle of the handle assembly with the switch mechanism is fixedly connected to the drive shaft.

In this way, regardless of whether the door is in a locked or unlocked state, the handle with the switch mechanism, namely, an interior handle, can always directly rotate and drive the drive shaft to rotate to unlock the door. The design reduces the steps of turning a knob of the interior handle before opening the door, ensuring timely escape in case of emergencies such as fire, and improving safety.

In addition, when the door is in the locked state, the door cannot be opened by rotating the exterior handle. In other words, the interior handle cannot be rotated by rotating the exterior handle, further improving safety.

In the lockset, the linkage mechanism includes a rotating sleeve and a limit element; the rotating sleeve and the limit element are movable to approach each other to be clamped for fixation; the handle is provided with a connection part and a grip part; an end of the connection part is provided with a mounting chamber; the rotating sleeve is axially fixed in the mounting chamber and rotatable circumferentially relative to the mounting chamber; the limit element is circumferentially fixed in the mounting chamber and driven by the switch mechanism to move to approach the rotating sleeve along a centerline of the mounting chamber; and the drive shaft and the rotating sleeve are fixed circumferentially.

In the present disclosure, the linkage mechanism includes the rotating sleeve and the limit element. The rotating sleeve is located in the mounting chamber. The rotating sleeve is rotatable circumferentially relative to the mounting chamber, but cannot move along the mounting chamber. The drive shaft is fixed to the rotating sleeve and is rotatable synchronously with the rotating sleeve. The limit element and the handle are fixed circumferentially, but the limit element is movable along the mounting chamber. The limit element and the rotating sleeve are movable to approach each other to be clamped for circumferential fixation. When the handle rotates, it sequentially drives the limit element, the rotating sleeve, and the drive shaft to rotate to open and close the door normally. When the limit element and the rotating sleeve are far away from each other, the handle can drive the limit element to rotate, but cannot drive the rotating sleeve to rotate. In this way, the rotating sleeve and the limit element form a clutch structure. When the door is locked, the transmission between the handle and the drive shaft fails, ensuring that the door cannot be opened through the handle, i.e., the external handle, thereby improving safety performance and extending the service life of an entire door lock.

In the lockset, the rotating sleeve is provided with a clamping slot; the limit element is provided with a clamping element matched with the clamping slot; and when the limit element approaches the rotating sleeve, the clamping element is inserted into the clamping slot such that the rotating sleeve and the limit element are fixed circumferentially.

The circumferential fixed transmission between the rotating sleeve and the limit element is achieved through the mutual cooperation of the clamping slot and the clamping element. When the limit element does not reach a position where the limit element is close enough to the rotating sleeve, there will always be no transmission between the limit element and the rotating sleeve. The structure effectively prevents the door from being forcefully opened from the outside after being locked, improving safety. In addition, the handle can maintain a rotatable state after the door is locked, so as to prevent damage caused by strong pulling, thereby extending the service life of the lockset.

In the lockset, an inner wall of the mounting chamber is provided with a travel slot along the centerline of the mounting chamber; an outer circumference of the rotating sleeve is provided with an annular protrusion; the clamping slot is located on the annular protrusion and corresponds to the travel slot in terms of position; the clamping element is located on an outer circumference of the limit element and clamped in the travel slot to fix the limit element and the mounting chamber circumferentially; and the switch mechanism is configured to drive the clamping element to move along the travel slot and be clamped into the clamping slot.

In the present disclosure, the mounting chamber of the handle is provided therein with the travel slot, and a raised element of the limit element is clamped in the travel slot and limited by the travel slot to be fixed circumferentially with the handle. The travel slot extends to the rotating sleeve and corresponds to the clamping slot of the rotating sleeve. The raised element can smoothly be guided and moved along the travel slot and clamped into the clamping slot to achieve the transmission fit of the rotating sleeve and the limit element. The travel slot plays a limiting and guiding role, achieving smooth operation of the entire mechanism, further improving safety and extending service life.

In the lockset, the switch mechanism includes a connection rod and a button assembly; the button assembly is fixed to the other handle assembly; the drive shaft is tubular; the connection rod passes through an inner side of the drive shaft; one end of the connection rod is connected to the button assembly, and the other end of the connection rod passes through the rotating sleeve and is abutted against the limit element; the button assembly is configured to drive the connection rod to rotate or move to push the limit element away from the rotating sleeve; and a reset spring is provided at a side of the limit element away from the connection rod for resetting the limit element.

In the present disclosure, the switch mechanism includes the connection rod and the button assembly. The connection rod passes through an inner side of the hollow drive shaft. One end of the connection rod is abutted against the limit element, and the other end of the connection rod is matched with the button assembly. The limit element is pushed away from the rotating sleeve by the connection rod. When a force on the connection rod disappears, the limit element moves closer to the rotating sleeve under an elastic force of the reset spring. Therefore, the switch mechanism features a compact structure, small size, high stability, and high safety. In addition, the switch mechanism is integrated into the drive shaft, thereby saving space.

In the lockset, the button assembly includes a knob and a connection element; the knob is rotatably connected to the grip part; the connection element is located inside the mounting chamber; the knob is coaxial with and fixedly connected to the connection element; and one end of the connection rod is fixed to the connection element and drives the connection rod to rotate synchronously when the knob is turned; and the other end of the connection rod forms an abutment part that protrudes circumferentially; the limit element is provided with a recessed part; the recessed part is provided with a curved surface; the abutment part is abutted against the curved surface; and when the connection rod rotates, the abutment part moves along the curved surface to allow the limit element to move along the centerline of the mounting chamber.

In the present disclosure, a push fit is formed between the connection rod and the limit element through the abutment parts and the curved surfaces. The button assembly controls the connection rod to rotate. When the connection rod rotates, its axial position does not change. When the connection rod rotates, it drives the abutment parts to rotate. The abutment parts are matched with the recessed parts of the limit element. The recessed parts are provided with the curved surfaces. When the abutment parts rotate, they move along the curved surfaces to push out the limit element. After leaving the curved surfaces, the abutment parts are abutted against a normal surface of the limit element. At this point, under the action of the reset spring, the axial position of the entire limit element is locked, ensuring high safety.

In the lockset, the linkage mechanism includes a pin; the pin is embedded in the handle; the drive shaft is connected to an end of the handle in a pluggable manner; the end of the handle is provided with a pin hole corresponding to the pin; and the switch mechanism is configured to drive the pin to be inserted into the pin hole to fix the handle and the drive shaft circumferentially.

This is another implementation of the linkage mechanism of the present disclosure. In this implementation, the linkage mechanism includes the pin. The pin is matched with the drive shaft in a pluggable manner, and the pin is inserted into the pin hole for transmission. The design can achieve the same technical effect as the above solution, extending the service life of the lockset while improving the safety performance of the lockset.

In the lockset, the switch mechanism includes a terminal controller and a solenoid valve; the solenoid valve is connected to the pin; and the terminal controller is configured to control opening and closing of the solenoid valve to drive the pin to extend and retract and insert into the pin hole.

This is another implementation of the switch mechanism of the present disclosure. In this implementation, the switch mechanism is a combination of the terminal controller and the solenoid valve. The terminal controller controls the opening and closing of the solenoid valve. The solenoid valve drives the pin to extend and retract so as to control the transmission fit between the handle and the drive shaft. The design can achieve the same technical effect as the above method.

A door lock includes a deadbolt mechanism and the lockset, where the deadbolt mechanism is connected to the drive shaft; and the drive shaft rotates to drive a deadbolt of the deadbolt mechanism to extend and retract.

Compared with the prior art, the present disclosure has the following advantages:

Unlike a conventional door lock, in the present disclosure, one of the handles is connected to the drive shaft through a linkage mechanism. In the locked state, one of the two handles, namely an exterior handle, can be rotated by an external force, but it cannot drive the drive shaft to rotate. Even if a strong external force is applied to the handle, the drive shaft cannot rotate, greatly improving the safety performance of the entire lockset. In addition, in the locked state, the handle is rotated to remove a certain amount of a torsional force, effectively preventing frequent or long-term twisting and shaking from causing deformation, thereby prolonging the service life of the lockset. In summary, the present disclosure improves the safety performance of the lockset and extends the service life thereof.

Reference Signs: 1. drive shaft; 2. handle assembly; 21. handle; 22. lock seat; 23. connection part; 24. grip part; 25. mounting chamber; 251. travel slot; 3. linkage mechanism; 31. rotating sleeve; 311. clamping slot; 312. annular protrusion; 32. limit element; 321. clamping element; 322. recessed part; 323. curved surface; 324. shallow slot; 33. reset spring; 4. switch mechanism; 41. connection rod; 411. abutment part; 42. button assembly; 43. knob; and 44. connection element.

DETAILED DESCRIPTION OF THE EMBODIMENTS

The technical solutions of the present disclosure are described in further detail below with reference to the specific embodiments and drawings, but the present disclosure is not limited thereto.

Embodiment 1

Figure 1:
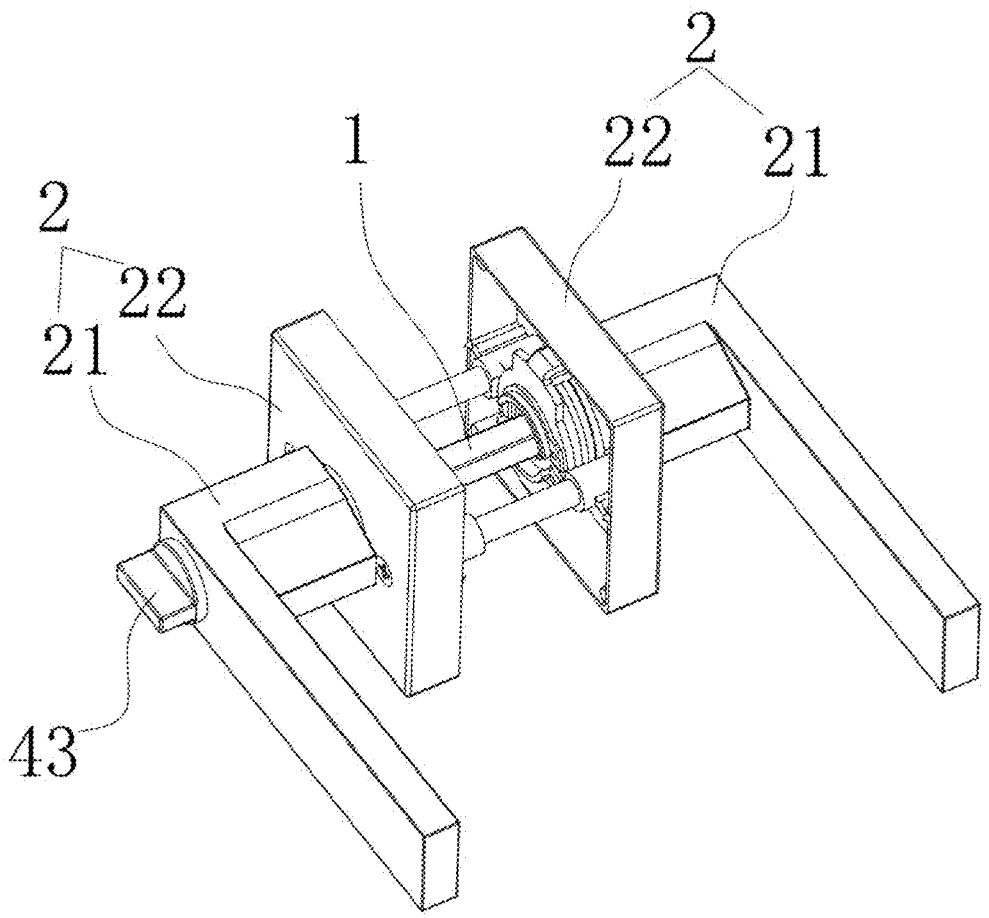
FIG. 1 is a structural diagram of a lockset according to the present disclosure.
Figure 2:
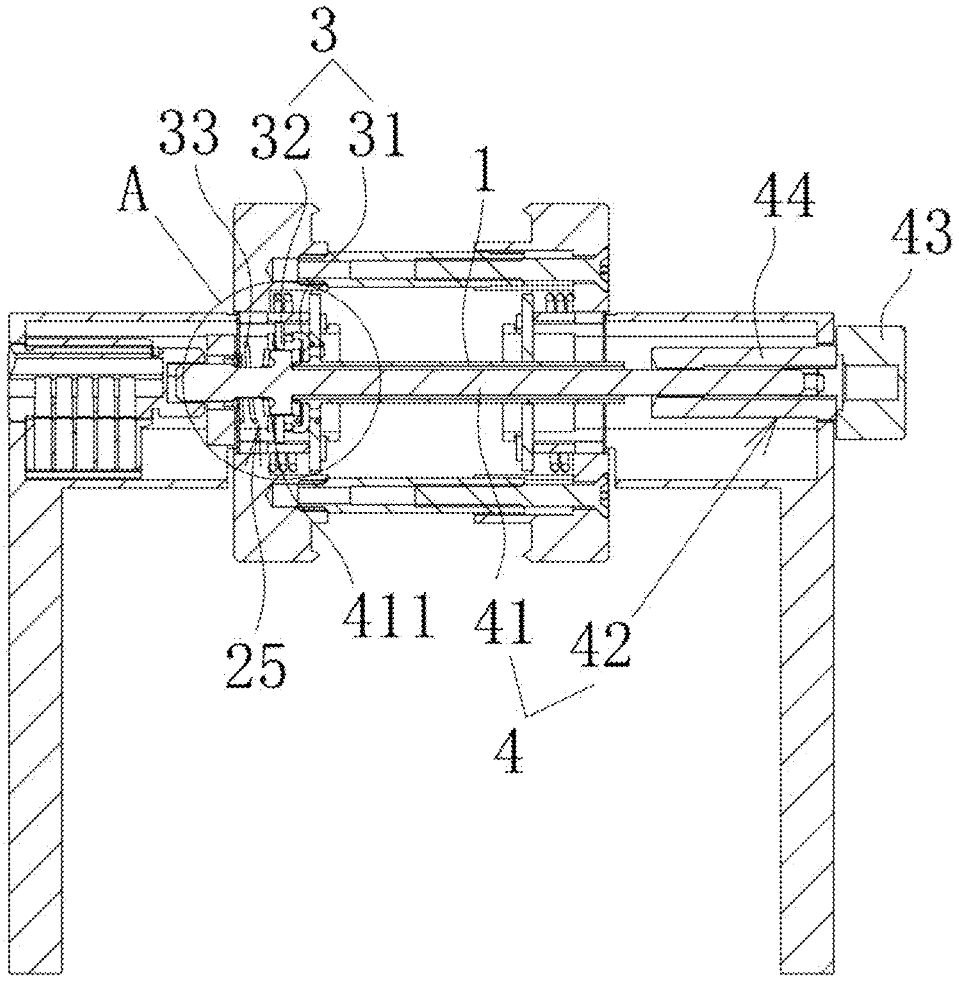
FIG. 2 is a section view of the lockset according to the present disclosure.
Figure 3:
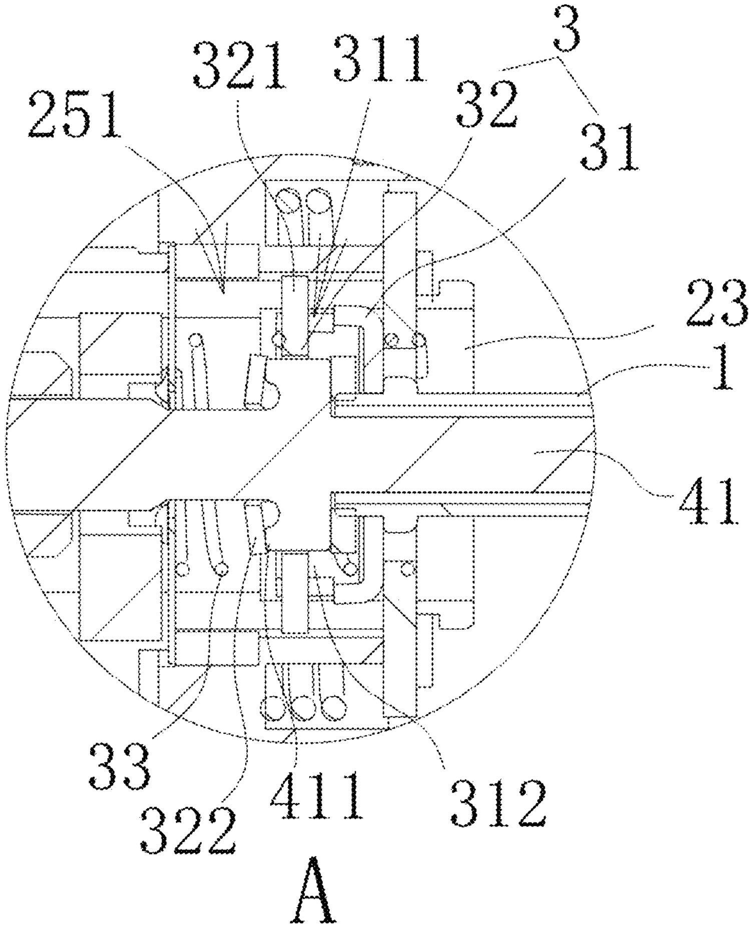
FIG. 3 is an enlarged view of A shown in FIG. 2 according to the present disclosure.
Figure 4:
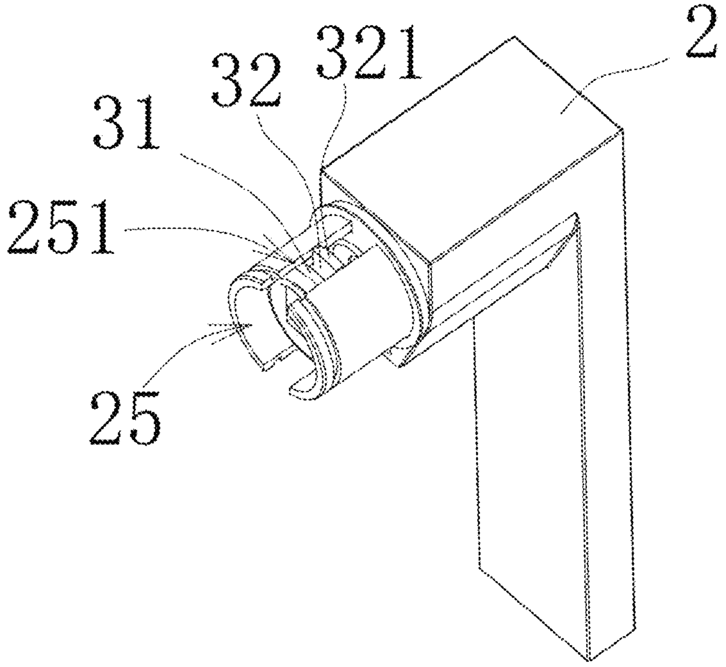
FIG. 4 is a structural diagram of one of handle assemblies according to the present disclosure.
Figure 5:
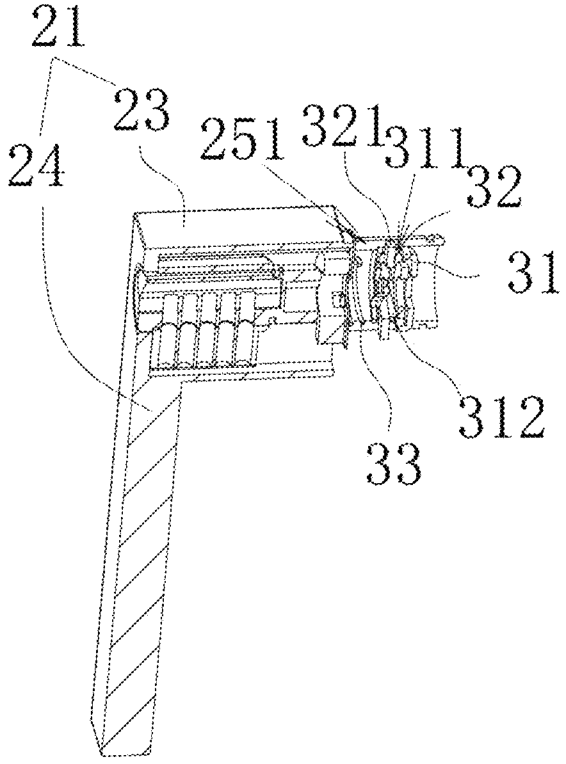
FIG. 5 is a structural diagram of one of handle assemblies according to the present disclosure.
Figure 6:
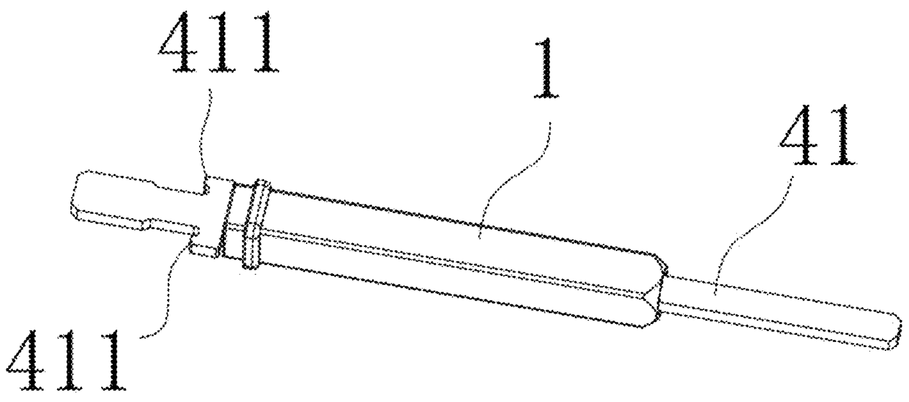
FIG. 6 is a schematic diagram of a part of the lockset according to the present disclosure.
Figure 7:
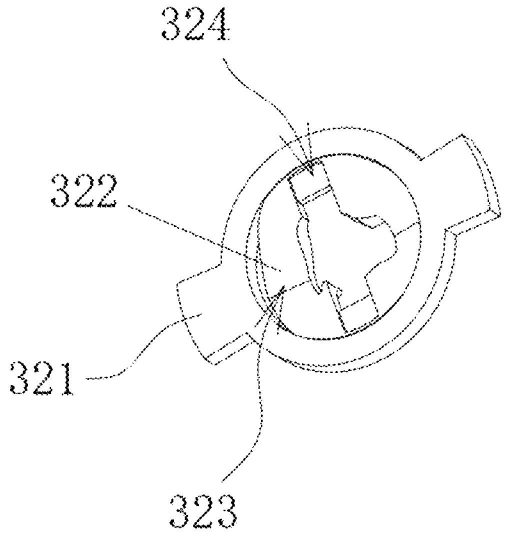
FIG. 7 is a schematic diagram of a limit element according to the present disclosure.

The present disclosure provides a lockset. As shown in FIGS. 1 to 7, the lockset includes drive shaft 1. Two ends of the drive shaft 1 are respectively connected to handle assemblies 2. The handle assembly 2 includes handle 21 and lock seat 22. The two lock seats 22 are respectively fixed to an inner side and an outer side of a door. The two handles 21 are respectively rotatably connected to the two lock seats 22. The two handle assemblies 2 form interior handle 21 and exterior handle 21, respectively. A reset coil spring is further provided between the handle 21 and the lock seat 22. The reset coil spring is configured to provide a force for reset rotation after the handle 21 rotates. The two handles 21 are rotatable to drive the drive shaft 1 to rotate. The drive shaft 1 is configured to drive a deadbolt mechanism to extend and retract. The deadbolt mechanism is an existing mature technical means in the art, and will not be elaborated too much here. Further, the handle 21 is provided with connection part 23 and grip part 24. An end of the connection part 23 is provided with mounting chamber 25. The two ends of the drive shaft 1 are respectively located in two mounting chambers 25. In the present disclosure, the drive shaft 1 is configured to drive the deadbolt to extend and retract, and the two ends of the drive shaft 1 are respectively extended and hidden in the two mounting chambers 25 to effectively protect the drive shaft 1.

Linkage mechanism 3 is provided between the exterior handle 21 of the handle assembly 2 and the drive shaft 1, and is configured to lock and circumferentially fix the exterior handle 21 and the drive shaft 1. The interior handle assembly 2 is provided with switch mechanism 4 for driving the linkage mechanism 3 to lock or unlock. When the switch mechanism 4 drives the linkage mechanism 3 to unlock, the exterior handle 21 is rotatable independently relative to the drive shaft 1. Unlike a conventional door lock, in the present disclosure, the exterior handle 21 is connected to the drive shaft 1 through the linkage mechanism 3, while the interior handle 21 is directly fixed to the drive shaft 1. The linkage mechanism 3 has two states. Under a normal state, the linkage mechanism 3 can lock (i.e. circumferentially fix) the exterior handle 21 and the drive shaft 1. In this state, the exterior handle 21 is rotatable to drive the drive shaft 1 to rotate synchronously. When the drive shaft 1 rotates, it normally drives the deadbolt to open and close the door. In a locked state, the linkage mechanism 3 can unlock the exterior handle 21 and the drive shaft 1 to release them from a circumferential fit. In this state, when there is an external force to rotate the exterior handle 21, the exterior handle 21 can be rotated normally. However, the exterior handle 21 cannot drive the drive shaft 1 to rotate, thereby making it hard to open the door normally. The two states of the linkage mechanism 3 are switched through the switch mechanism 4 of the interior handle 21. In summary, the biggest difference between the lockset of the present disclosure and the conventional lockset is that one of the two handles 21, namely the exterior handle 21, can be rotated by an external force when in the locked state, but it cannot drive the drive shaft 1 to rotate. Even if a strong external force is applied to the exterior handle 21, the drive shaft 1 cannot rotate, greatly improving the safety performance of the entire lockset. In addition, in the locked state, the exterior handle 21 is rotated to remove a certain amount of a torsional force, effectively preventing frequent or long-term twisting and shaking from causing deformation, thereby prolonging the service life of the lockset. Therefore, the present disclosure improves the safety performance of the lockset and extends the service life thereof.

In the present disclosure, the exterior handle 21 is connected to the drive shaft 1 through the linkage mechanism 3, while the interior handle 21 is directly fixed to the drive shaft

1. In this way, regardless of whether the door is in a locked or unlocked state, the interior handle 21 located on the inner side of the door can always directly rotate and drive the drive shaft 1 to rotate to unlock the door. As for an ordinary lockset, to unlock it at the inner side of the door, a user needs to turn and press down on knob 43 with a hand. In contrast, in the present disclosure, regardless of whether the door is in the locked state, the door can be opened by pressing down on the interior handle 21. The present disclosure reduces the steps of turning the knob 43 before opening the door, ensuring timely escape in case of emergencies such as fire, and improving safety. In addition, when the door is in the locked state, the door cannot be opened by rotating the exterior handle 21. In other words, the interior handle 21 cannot be rotated by rotating the exterior handle, further improving safety.

In the present disclosure, a specific structure of the linkage mechanism is as follows. The linkage mechanism 3 includes rotating sleeve 31 and limit element 32. The rotating sleeve and the limit element are movable to approach each other to be clamped for fixation. The rotating sleeve 31 is axially fixed in the mounting chamber 25 and rotatable circumferentially relative to the mounting chamber 25. The limit element 32 is circumferentially fixed in the mounting chamber 25, and the limit element 32 is driven by the switch mechanism 4 to move to approach the rotating sleeve 31 along a centerline of the mounting chamber 25. The drive shaft 1 and the rotating sleeve 31 are fixed circumferentially. In the present disclosure, the linkage mechanism 3 includes the rotating sleeve 31 and the limit element 32. The rotating sleeve 31 is located in the mounting chamber 25. The rotating sleeve is rotatable circumferentially relative to the mounting chamber 25, but cannot move along the mounting chamber 25. The drive shaft 1 is fixed to the rotating sleeve 31 and is rotatable synchronously with the rotating sleeve 31. The limit element 32 and the handle 21 are fixed circumferentially, but the limit element 32 is movable along the mounting chamber 25. The limit element 32 and the rotating sleeve 31 are movable to approach each other to be clamped for circumferential fixation. When the handle 21 rotates, it sequentially drives the limit element 32, the rotating sleeve 31, and the drive shaft 1 to rotate to open and close the door normally. When the limit element 32 and the rotating sleeve 31 are far away from each other, the handle 21 can drive the limit element 32 to rotate, but cannot drive the rotating sleeve 31 to rotate. In this way, the rotating sleeve 31 and the limit element 32 form a clutch structure. When the door is locked, the transmission between the handle 21 and the drive shaft 1 fails, ensuring that the door cannot be opened through the handle 21, i.e., the external handle 21, thereby improving safety performance and extending the service life of an entire door lock.

Further, the rotating sleeve 31 is provided with clamping slot 311, and the limit element 32 is provided with clamping element 321 matched with the clamping slot 311. When the limit element 32 approaches the rotating sleeve 31, the clamping element 321 is inserted into the clamping slot 311 to fix the rotating sleeve 31 and the limit element 32 circumferentially. The circumferential fixed transmission between the rotating sleeve 31 and the limit element 32 is achieved through the mutual cooperation of the clamping slot 311 and the clamping element 321. When the limit element 32 does not reach a position where the limit element is close enough to the rotating sleeve 31, there will always be no transmission between the limit element 32 and the rotating sleeve 31. The structure effectively prevents the door from being forcefully opened from the outside after being locked, improving safety. In addition, the handle 21 can maintain a rotatable state after the door is locked, so as to prevent damage caused by strong pulling, thereby extending the service life of the lockset.

Preferably, an inner wall of the mounting chamber 25 is provided with travel slot 251 along the centerline of the mounting chamber 25, and an outer circumference of the rotating sleeve 31 is provided with annular protrusion 312. The clamping slot 311 is located on the annular protrusion 312, and the clamping slot 311 corresponds to the travel slot 251 in terms of position. The clamping element 321 is located on an outer circumference of the limit element 32, and the clamping element 321 is clamped in the travel slot 251 to fix the limit element 32 and the mounting chamber 25 circumferentially. The switch mechanism 4 can drive the clamping element 321 to move along the travel slot 251 and be clamped into the clamping slot 311. In the present disclosure, the mounting chamber 25 of the handle 21 is provided therein with the travel slot 251, and a raised element of the limit element 32 is clamped in the travel slot 251 and limited by the travel slot 251 to be fixed circumferentially with the handle 21. The travel slot 251 extends to the rotating sleeve 31 and corresponds to the clamping slot 311 of the rotating sleeve 31. The raised element can smoothly be guided and moved along the travel slot 251 and clamped into the clamping slot 311 to achieve the transmission fit of the rotating sleeve 31 and the limit element 32. The travel slot 251 plays a limiting and guiding role, achieving smooth operation of the entire mechanism, further improving safety and extending service life.

In the present disclosure, a specific structure of the switch mechanism 4 is as follows. The switch mechanism 4 includes connection rod 41 and button assembly 42. The button assembly 42 is fixed to the other handle assembly 2. The drive shaft 1 is tubular. The connection rod 41 passes through an inner side of the drive shaft 1. One end of the connection rod 41 is connected to the button assembly 42, and the other end of the connection rod 41 passes through the rotating sleeve 31 and is abutted against the limit element 32. The button assembly 42 drives the connection rod 41 to rotate to push the limit element 32 away from the rotating sleeve 31. Reset spring 33 is provided at a side of the limit element 32 away from the connection rod 41 for resetting the limit element 32. In the present disclosure, the switch mechanism 4 includes the connection rod 41 and the button assembly 42. The connection rod 41 passes through an inner side of the hollow drive shaft 1. One end of the connection rod 41 is abutted against the limit element 32, and the other end of the connection rod 41 is matched with the button assembly 42. The limit element 32 is pushed away from the rotating sleeve 31 by the connection rod 41. When a force on the connection rod 41 disappears, the limit element 32 moves closer to the rotating sleeve 31 under an elastic force of the reset spring 33. Therefore, the switch mechanism 4 features a compact structure, small size, high stability, and high safety. In addition, the switch mechanism is integrated into the drive shaft 1, thereby saving space.

Further, the button assembly 42 includes knob 43 and connection element 44. The knob 43 is rotatably connected to the grip part 24. The connection element 44 is located inside the mounting chamber 25. The knob 43 is coaxial with and fixedly connected to the connection element 44. One end of the connection rod 41 is fixed to the connection element 44 and drives the connection rod 41 to rotate synchronously when the knob 43 is turned. The other end of the connection rod 41 forms abutment parts 411 that protrude circumferentially. The limit element 32 is provided with recessed parts 322. The recessed parts 322 each are provided with curved surface 323. The abutment parts 411 are abutted against the curved surfaces 323, and when the connection rod 41 rotates, the abutment parts 411 move along the curved surfaces 323 to allow the limit element 32 to move along the centerline of the mounting chamber 25. In the present disclosure, a push fit is formed between the connection rod 41 and the limit element 32 through the abutment parts 411 and the curved surfaces 323. The button assembly 42 controls the connection rod 41 to rotate. When the connection rod 41 rotates, its axial position does not change. When the connection rod 41 rotates, it drives the abutment parts 411 to rotate. The abutment parts 411 are matched with the recessed parts 322 of the limit element 32. The recessed parts 322 are provided with the curved surfaces 323. When the abutment parts 411 rotate, they move along the curved surfaces 323 to push out the limit element 32. After leaving the curved surfaces 323, the abutment parts 411 are abutted against a normal surface of the limit element 32. At this point, under the action of the reset spring 33, the axial position of the entire limit element 32 is locked, ensuring high safety.

Further, in the present disclosure, the limit element 32 is annular. There are two raised elements on the outer circumference of the limit element. The two raised elements are symmetrical, and are matched with the two travel slots 251 at the side walls of the mounting chambers. A side part of the limit element 32 adjacent to the limit sleeve is provided with two symmetrically distributed waist-shaped recessed parts 322. There are two platforms provided between the two recessed parts 322. The platforms are located at highest points and are provided with shallow slots 324. The abutment parts 411 slide from the recessed parts 322 to the platforms to be clamped into the shallow slots 324. When an external force is applied to rotate the entire exterior handle 21, the shallow slots 324 limit and prevent the abutment parts 411 from falling off. Meanwhile, the reset spring 33 applies a certain pushing force to prevent the abutment parts 411 from easily coming out of the shallow slots 324. The entire connection rod 41 can be driven to rotate from a button, causing the abutment parts 411 to detach from the shallow slots 324 and move to the recessed parts 322. The design ensures a reasonable structure and high safety.

The present disclosure further provides a door lock, including a deadbolt mechanism and the lockset. The deadbolt mechanism is connected to the drive shaft 1, and the drive shaft 1 rotates to drive a deadbolt of the deadbolt mechanism to extend and retract.

Embodiment 2

This embodiment provides another implementation of the linkage mechanism of the present disclosure. The structure in this embodiment is basically the same as that in Embodiment 1, with the following differences. The linkage mechanism 3 includes a pin. The pin is embedded in the side wall of the mounting chamber 25. An end of the drive shaft 1 is provided with a pin hole corresponding to the pin, and the switch mechanism 4 drives the pin to be inserted into the pin hole to fix the handle 21 and the drive shaft 1 circumferentially. The design can achieve the same technical effect as the above solution, extending the service life of the lockset while improving the safety performance of the lockset.

In this implementation, the switch mechanism 4 includes a terminal controller and a solenoid valve. The solenoid valve is connected to the pin. The terminal controller is configured to control the opening and closing of the solenoid valve to drive the pin to extend and retract and insert into the pin hole. The switch mechanism 4 is a combination of the terminal controller and the solenoid valve. The solenoid valve can be a solenoid valve with a temperature bulb. The temperature bulb drives the pin to extend. The terminal controller controls the opening and closing of the solenoid valve. The terminal controller can be a central control computer with a display screen, which directly controls the solenoid valve through the display screen. The solenoid valve drives the pin to extend and retract so as to control the transmission fit between the handle 21 and the drive shaft 1. The design can achieve the same technical effect as the above method.

The present disclosure further provides a door lock, including a deadbolt mechanism and the lockset. The deadbolt mechanism is connected to the drive shaft 1, and the drive shaft 1 rotates to drive a deadbolt of the deadbolt mechanism to extend and retract.

It should be explained that in the description of the present disclosure, terms such as “central”, “upper”, “lower”, “front”, “rear”, “left”, “right” “vertical”, “horizontal”, “top”, “bottom”, “inside” and “outside” indicate the orientation or positional relationships based on the drawings. They are merely intended to facilitate and simplify the description of the present disclosure, rather than to indicate or imply that the mentioned device or components must have a specific orientation or must be constructed and operated in a specific orientation. Therefore, these terms should not be construed as a limitation to the present disclosure. Those skilled in the art should understand the basic principles, main features and advantages of the present disclosure described above.

What is claimed is:

1. A lockset, comprising:

a drive shaft, wherein two ends of the drive shaft are respectively connected to a first handle assembly and a second handle assembly; each of the first handle assembly and the second handle assembly comprises a handle and a lock seat; a linkage mechanism is provided between the handle of the first handle assembly and the drive shaft, and the linkage mechanism is configured to lock the handle and the drive shaft such that the handle and the drive shaft are circumferentially fixed; the second handle assembly is provided with a switch mechanism for driving the linkage mechanism to lock or unlock; and when the switch mechanism drives the linkage mechanism to unlock, the handle is rotatable independently relative to the drive shaft;

wherein the linkage mechanism comprises a rotating sleeve and a limit element, wherein the rotating sleeve and the limit element are movable to approach each other to be clamped for fixation; the handle is provided with a connection part and a grip part; an end of the connection part is provided with a mounting chamber; the rotating sleeve is axially fixed in the mounting chamber and rotatable circumferentially relative to the mounting chamber; the limit element is circumferentially fixed in the mounting chamber and driven by the switch mechanism to move to approach the rotating sleeve along a centerline of the mounting chamber; and the drive shaft and the rotating sleeve are fixed circumferentially;

wherein the switch mechanism comprises a single connection rod and a button assembly; the button assembly is fixed to the second handle assembly; the drive shaft is tubular; the connection rod passes through an inner side of the drive shaft; a first end of the connection rod is connected to the button assembly, and a second end of the connection rod passes through the rotating sleeve and is abutted against the limit element; the button assembly is configured to drive the connection rod to rotate or move to push the limit element away from the rotating sleeve; and a reset spring is provided at a side of the limit element away from the connection rod for resetting the limit element;

the second end of the connection rod forms an abutment part that protrudes circumferentially; the limit element is provided with a recessed part; the recessed part is provided with a curved surface; the abutment part is abutted against the curved surface; and when the connection rod rotates, the abutment part moves along the curved surface to allow the limit element to move along the centerline of the mounting chamber; and a highest point of the recessed part is connected to a platform, and a shallow slot is provided on the platform; the abutment part is configured to be inserted into the shallow slot after moving along the curved surface to the platform.

2. The lockset according to claim 1, wherein the handle of the second handle assembly is fixedly connected to the drive shaft.

3. The lockset according to claim 2, wherein the linkage mechanism comprises a pin; the pin is embedded in the handle; the drive shaft is connected to an end of the handle in a pluggable manner; the end of the handle is provided with a pin hole corresponding to the pin; and the switch mechanism is configured to drive the pin to be inserted into the pin hole to fix the handle and the drive shaft circumferentially.

4. The lockset according to claim 1, wherein the rotating sleeve is provided with a clamping slot; the limit element is provided with a clamping element matched with the clamping slot; and when the limit element approaches the rotating sleeve, the clamping element is inserted into the clamping slot such that the rotating sleeve and the limit element are fixed circumferentially.

5. The lockset according to claim 4, wherein an inner wall of the mounting chamber is provided with a travel slot along the centerline of the mounting chamber; an outer circumference of the rotating sleeve is provided with an annular protrusion; the clamping slot is located on the annular protrusion and corresponds to the travel slot in terms of position; the clamping element is located on an outer circumference of the limit element and clamped in the travel slot to fix the limit element and the mounting chamber circumferentially; and the switch mechanism is configured to drive the clamping element to move along the travel slot and be clamped into the clamping slot.

6. The lockset according to claim 5, wherein the switch mechanism comprises a connection rod and a button assembly; the button assembly is fixed to the second handle assembly; the drive shaft is tubular; the connection rod passes through an inner side of the drive shaft; a first end of the connection rod is connected to the button assembly, and a second end of the connection rod passes through the rotating sleeve and is abutted against the limit element; the button assembly is configured to drive the connection rod to rotate or move to push the limit element away from the rotating sleeve; and a reset spring is provided at a side of the limit element away from the connection rod for resetting the limit element.

7. The lockset according to claim 4, wherein the switch mechanism comprises a connection rod and a button assembly; the button assembly is fixed to the second handle assembly; the drive shaft is tubular; the connection rod passes through an inner side of the drive shaft; a first end of the connection rod is connected to the button assembly, and a second end of the connection rod passes through the rotating sleeve and is abutted against the limit element; the button assembly is configured to drive the connection rod to rotate or move to push the limit element away from the rotating sleeve; and a reset spring is provided at a side of the limit element away from the connection rod for resetting the limit element.

8. The lockset according to claim 1, wherein the button assembly comprises a knob and a connection element; the knob is rotatably connected to the grip part; the connection element is located inside the mounting chamber; the knob is coaxial with and fixedly connected to the connection element; and the first end of the connection rod is fixed to the connection element and drives the connection rod to rotate synchronously when the knob is turned.

9. The lockset according to claim 1, wherein the linkage mechanism comprises a pin; the pin is embedded in the handle; the drive shaft is connected to an end of the handle in a pluggable manner; the end of the handle is provided with a pin hole corresponding to the pin; and the switch mechanism is configured to drive the pin to be inserted into the pin hole to fix the handle and the drive shaft circumferentially.

10. The lockset according to claim 9, wherein the switch mechanism comprises a terminal controller and a solenoid valve; the solenoid valve is connected to the pin; and the terminal controller is configured to control opening and closing of the solenoid valve to drive the pin to extend and retract and insert into the pin hole.

11. A door lock, comprising:

a deadbolt mechanism and the lockset according to claim 1, wherein the deadbolt mechanism is connected to the drive shaft; and the drive shaft rotates to drive a deadbolt of the deadbolt mechanism to extend and retract.

12. The door lock according to claim 11, wherein in the lockset, the handle of the second handle assembly is fixedly connected to the drive shaft.

13. The door lock according to claim 12, wherein in the lockset, the linkage mechanism comprises a rotating sleeve and a limit element, wherein the rotating sleeve and the limit element are movable to approach each other to be clamped for fixation; the handle is provided with a connection part and a grip part; an end of the connection part is provided with a mounting chamber; the rotating sleeve is axially fixed in the mounting chamber and rotatable circumferentially relative to the mounting chamber; the limit element is circumferentially fixed in the mounting chamber and driven by the switch mechanism to move to approach the rotating sleeve along a centerline of the mounting chamber; and the drive shaft and the rotating sleeve are fixed circumferentially.

14. The door lock according to claim 13, wherein in the lockset, the rotating sleeve is provided with a clamping slot; the limit element is provided with a clamping element matched with the clamping slot; and when the limit element approaches the rotating sleeve, the clamping element is inserted into the clamping slot such that the rotating sleeve and the limit element are fixed circumferentially.

15. The door lock according to claim 14, wherein in the lockset, an inner wall of the mounting chamber is provided with a travel slot along the centerline of the mounting chamber; an outer circumference of the rotating sleeve is provided with an annular protrusion; the clamping slot is located on the annular protrusion and corresponds to the travel slot in terms of position; the clamping element is located on an outer circumference of the limit element and clamped in the travel slot to fix the limit element and the mounting chamber circumferentially; and the switch mechanism is configured to drive the clamping element to move along the travel slot and be clamped into the clamping slot.

16. The door lock according to claim 13, wherein in the lockset, the switch mechanism comprises a connection rod and a button assembly; the button assembly is fixed to the second handle assembly; the drive shaft is tubular; the connection rod passes through an inner side of the drive shaft; a first end of the connection rod is connected to the button assembly, and a second end of the connection rod passes through the rotating sleeve and is abutted against the limit element; the button assembly is configured to drive the connection rod to rotate or move to push the limit element away from the rotating sleeve; and a reset spring is provided at a side of the limit element away from the connection rod for resetting the limit element.

17. The door lock according to claim 16, wherein in the lockset, the button assembly comprises a knob and a connection element; the knob is rotatably connected to the grip part; the connection element is located inside the mounting chamber; the knob is coaxial with and fixedly connected to the connection element; and a second end of the connection rod is fixed to the connection element and drives the connection rod to rotate synchronously when the knob is turned; and a second end of the connection rod forms an abutment part that protrudes circumferentially; the limit element is provided with a recessed part; the recessed part is provided with a curved surface; the abutment part is abutted against the curved surface; and when the connection rod rotates, the abutment part moves along the curved surface to allow the limit element to move along the centerline of the mounting chamber.

18. The door lock according to claim 11, wherein in the lockset, the linkage mechanism comprises a pin; the pin is embedded in the handle; the drive shaft is connected to an end of the handle in a pluggable manner; the end of the handle is provided with a pin hole corresponding to the pin; and the switch mechanism is configured to drive the pin to be inserted into the pin hole to fix the handle and the drive shaft circumferentially.

* * * * *